United States Patent

Nollet et al.

[11] Patent Number: 6,133,708
[45] Date of Patent: Oct. 17, 2000

[54] RADIO APPARATUS COMPRISING A CHARGING DEVICE

[75] Inventors: Michel Nollet, Noisy le Roi; Laurence Babin; Didier Herrouin, both of Le Mans, all of France

[73] Assignee: U.S. Philips Corporation, New York, N.Y.

[21] Appl. No.: 09/329,032

[22] Filed: Jun. 9, 1999

[30] Foreign Application Priority Data

Jun. 16, 1998 [FR] France ................................... 98 07587

[51] Int. Cl.$^7$ ....................................................... H02J 7/00
[52] U.S. Cl. ........................................................... 320/107
[58] Field of Search ................................. 320/103, 106, 320/107

[56] References Cited

U.S. PATENT DOCUMENTS

| | | | |
|---|---|---|---|
| 5,212,836 | 5/1993 | Matsushita | 455/343 |
| 5,216,302 | 6/1993 | Tanizawa | 307/603 |
| 5,237,257 | 8/1993 | Johnson et al. | 320/106 |
| 5,336,985 | 8/1994 | McKenzie | 323/266 |
| 5,363,031 | 11/1994 | Miller et al. | 320/160 |
| 5,396,163 | 3/1995 | Nor et al. | 320/159 |
| 5,461,262 | 10/1995 | Hirasawa et al. | 320/125 |
| 5,596,567 | 1/1997 | Demuro et al. | 320/106 |
| 5,771,471 | 6/1998 | Alberth, Jr. et al. | 435/573 |
| 5,939,856 | 8/1999 | Demuro et al. | 320/106 |

FOREIGN PATENT DOCUMENTS

0375289A2  6/1990  European Pat. Off. ........ H05B 39/08

OTHER PUBLICATIONS

By IBM Technical Disclosure Bulletin, "LI–ION/NIHM Quick Charge System in Notebook PC", vol. 38, No. 4, Apr. 1, 1995, pp. 319–320.

*Primary Examiner*—Shawn Riley
*Assistant Examiner*—Pia Tibbits

[57] ABSTRACT

A charging system is provided with a device and a first energy source remotely located from each other. The device has a second energy source to be charged and that receives energy from a power supply of the first energy source. The device further has a measuring circuit. The measuring circuit provides an error signal obtained from an electrical quantity of the second energy source. The first energy source also has a regulation circuit coupled to the power supply. A high impedance control input of the regulation circuit receives the error signal. In response to this error signal, the regulation circuit regulates the voltage of the power supply.

10 Claims, 3 Drawing Sheets

RADIO APPARATUS COMPRISING A CHARGING DEVICE

FIELD OF THE INVENTION

The present invention relates to an apparatus comprising a charging device formed by:
  a circuit to be charged, situated at a first location,
  an energy source having a regulation control situated at a second location,
  a link for connecting said locations and for transmitting energy,
  a measuring circuit for supplying an error signal to said regulation control while evaluating an electrical magnitude relating to said circuit to be charged.

The invention also relates to a charging system suitable for such an apparatus.

BACKGROUND OF THE INVENTION

Apparatus of this type are well known and have numerous applications, notably in the field of portable telephones for which the circuit to be charged is formed by a battery located in the housing that forms the handset. This battery is to be recharged by an energy source formed by a charging circuit connected to the power grid.

A problem which is posed with apparatus of this type is that the charging voltage of the battery should be well adapted to the battery. Notably for lithium-ion batteries this voltage is to be 4.1 volts plus or minus 1%. If the charging voltage is below this value, the battery is never charged well and if the voltage is too high, one runs the risk of a deterioration of the battery or else an explosion.

SUMMARY OF THE INVENTION

The present invention proposes an apparatus of the type defined in the opening paragraph in which means are provided for controlling the charging voltage to be applied to the battery, which apparatus is degraded neither by the length of the wires nor by the quality of the contacts provided for connecting the line in the region of the locations.

Therefore, such an apparatus is characterized in that:
  the measuring circuit is situated at the first location.

The inventive idea is based on the fact that the value of the error signal is transmitted in a more certain manner than that a charging voltage is applied whose value depends too much on the contacts of the connections of the link in the region of the locations, these good or less good contacts causing more or less considerable losses to occur as a function of the current that flows through the link.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
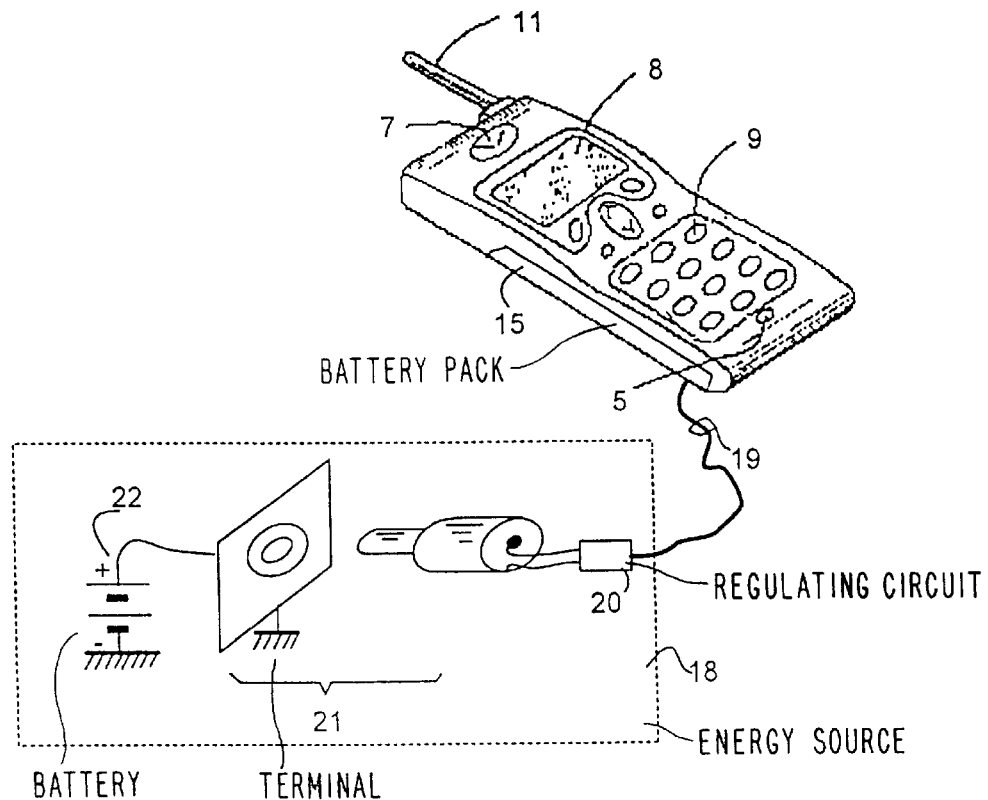
FIG. 1 shows an apparatus in accordance with the invention.

In FIG. 1 is represented an electronic apparatus according to the invention. Within the framework of the described example, it is a portable radiotelephone of the type that is used in cellular systems. It is formed by a microphone 5, an earpiece 7, a display 8, a keyboard 9 and an antenna 11. For being able to function, this apparatus uses a battery pack 15. This pack 15 may be recharged by an energy source 18 linked to this battery pack 15 by a link 19. This energy source is formed by a regulating circuit 20 coupled via a terminal 21 to a motor car battery 22.

Figure 2:
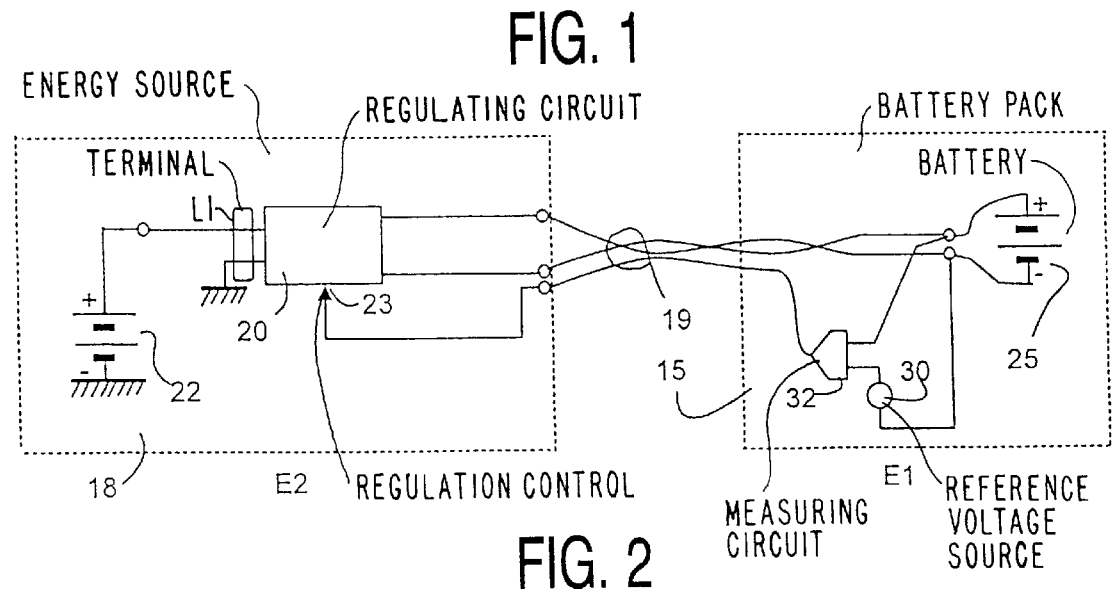
FIG. 2 shows an overall diagram of an embodiment of the invention.

FIG. 2 shows the overall diagram of an embodiment according to the invention. According to this diagram, the actual battery 25 which forms part of pack 15 is arranged at a first location E1 in the electronic apparatus within the scope of the described example. The power supply 18 is situated at a second location E2, near to the terminal 21. The regulating circuit 20 is provided for modifying the voltage produced by the battery 22 so as to adapt it to the charging of the battery 25. For this purpose, it has a regulation control 23.

According to the invention, for charging the battery 25, the voltage on its poles is measured by means of a measuring circuit 32 and compared to a first set voltage produced by a reference voltage source 30. The error signal Verr representing the result of this comparison is transmitted to the control 23.

Figure 3:
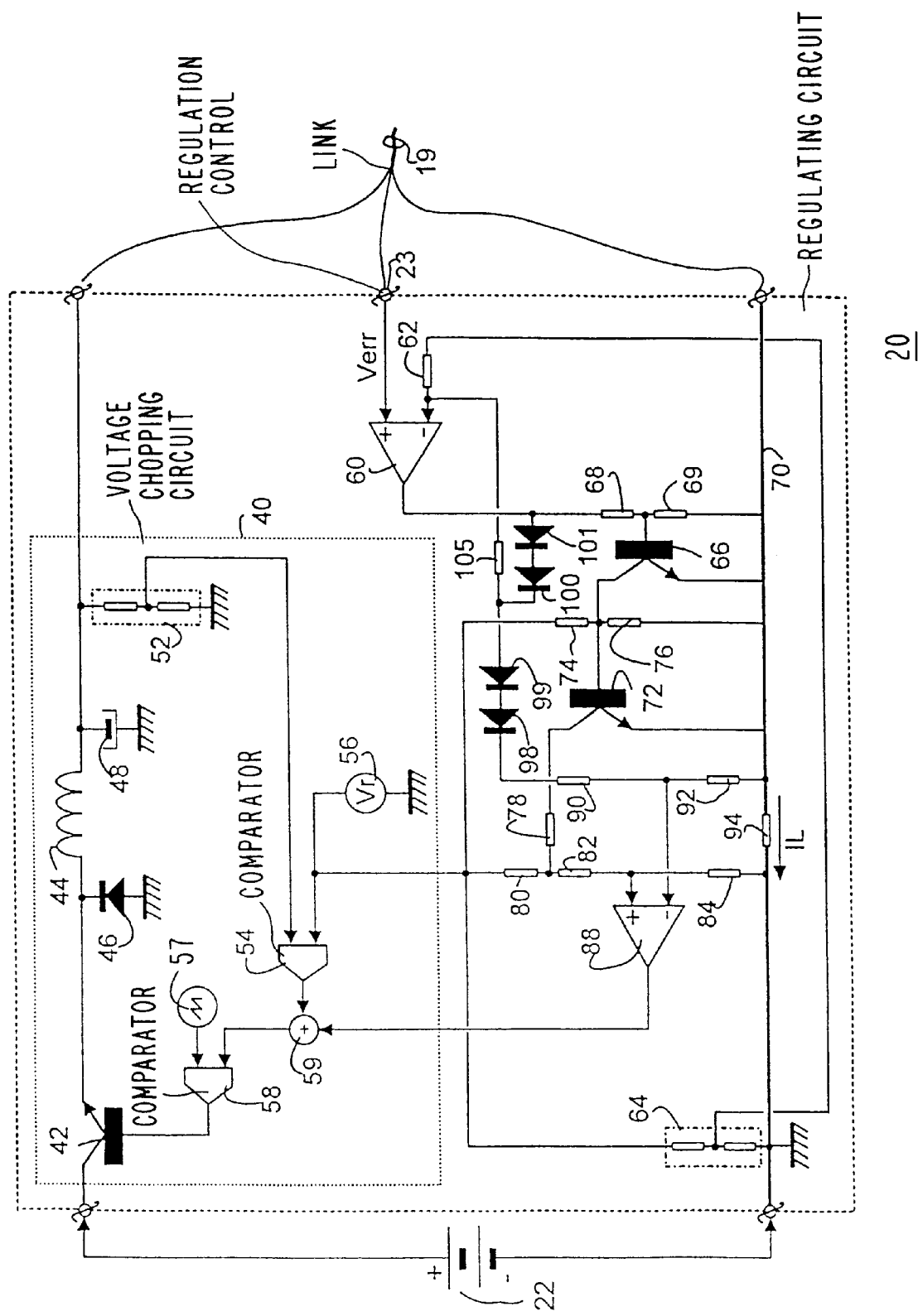
FIG. 3 is a detailed embodying mode of the regulating circuit.

FIG. 3 shows this regulating circuit in detail. It is formed around a voltage chopping circuit 40. This circuit 40 comprises a transistor 42 which acts as an on/off switch that chops the voltage produced by the battery 22. The voltage thus chopped is applied to a self-inductance element 44 which stores a certain quantity of current during the time when the transistor 42 is conducting and returns this quantity to the load while flowing through a diode 46 during the time when the latter is not conducting. A capacitor 48 attenuates the switch transients. A potentiometer divider 52 takes a part of the output voltage as a sample for applying this voltage part to a comparator 54 which compares the part thus sampled to a reference voltage produced by a reference voltage source 56. The signal giving the result of the latter comparison is applied to a first input of another comparator 58 via a voltage adder 59. To the other input of the comparator 58 is applied a sweep voltage produced by a sweep voltage generator 57. It is the signal produced by this comparator 58 that will determine the conductive or non-conductive state of the transistor 42. Thus, the higher the voltage applied to said first input is, the shorter the conductive periods of the transistor will be, so that the output voltage of the circuit 40 is reduced. A description of such a circuit is given by the specifications relating to the circuit registered as L4976, manufactured by Thomson SGS.

Figure 4:
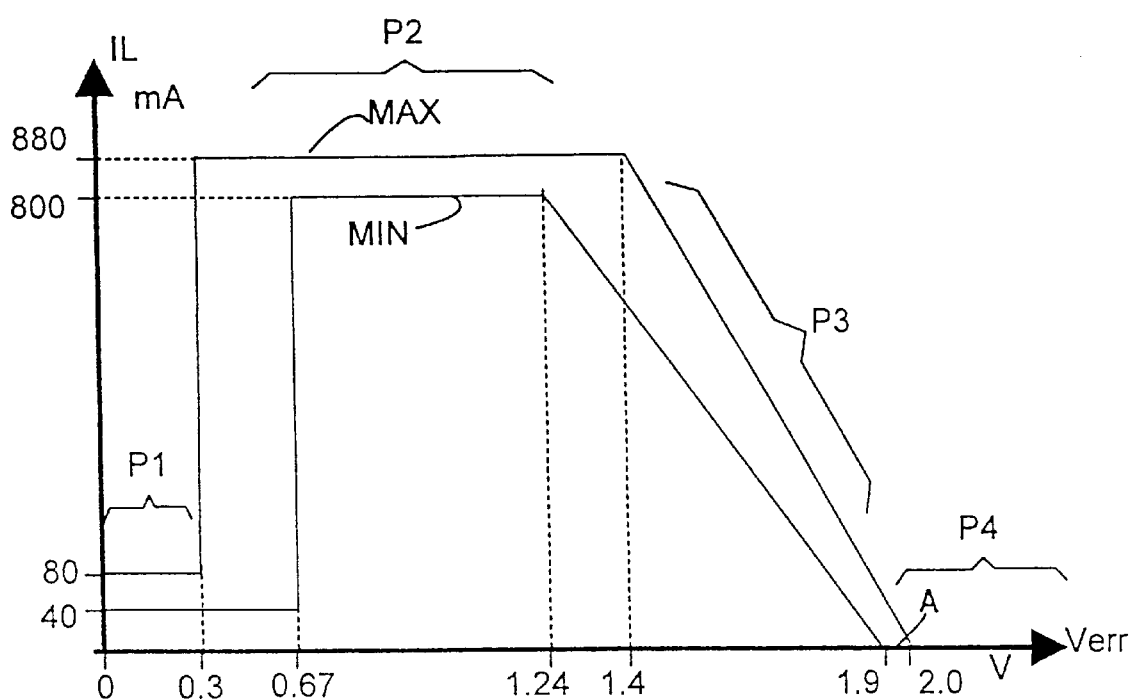
FIG. 4 is the control pattern respected by the device according to the invention.

In order to respect the needs of all the batteries (current or precharged), it has been observed that the charging control had to adhere to a certain pattern which is shown in FIG. 4. On the x-axis is shown a voltage Verr which is a function of the voltage on the terminals of the battery 25. On the y-axis is shown the charging current IL of this battery 25 which is a function of Verr. In this Figure, point A indicates a maximum charging state of the battery, which corresponds to a voltage Verr of 2 volts and a zero current IL. Actually, it is important to underline that a battery should not be charged too much because of the risk of explosion. The values proposed by this pattern lie between the two curves MAX and MIN to take the tolerances of the components of the electronic circuits into account. This pattern has various parts:

The part P1 is a precharging period and relates to a particularly discharged battery 25.

In order to make the charger go over to the rapid charging mode, a voltage Verr lying between 0.67 V and 1.24 V is supplied the moment the voltage of the battery exceeds a value (for example 3 V) beyond which it can support the rapid charging current without any damage.

This increase of the voltage Verr may be obtained by means of a comparator which is not the comparator 32, but which may be situated at the level of the battery or in the telephone that the battery supplies with power (or even somewhere else). Alternatively, this increase of the voltage "Verr" may be obtained by means of an analog/digital converter read by a microcontroller contained in the telephone, this microcontroller then producing on one of its outputs the logic voltage necessary for controlling the increase of the voltage Verr.

The use of this increase of the voltage Verr for changing from the pre-charging current to the post-charging current is made by part of the circuit of FIG. 3. It is the first role of the operational amplifier 60 that has a very large gain and thus operates as a comparator, as long as the diodes 100 and 101 are blocked. The voltage "Verr" arriving on its +input is compared with the voltage arriving on its negative input via the resistor 62 and produced by a potentiometer divider 64.

When Verr transgresses the voltage produced by the divider bridge 64 (about 0.5 V), the output of 60 becomes positive, which renders the transistor 66 conducting and thus blocks the transistor 72 which then disconnects the resistor 78. This thus increases the value of the voltage applied to the operational amplifier 88 (+input) by the divider bridge 80-82-84 and the result is the increase of the sought output current, because the voltage produced by this current in the resistor 94 is compared by the operational amplifier 88 with the voltage produced by the divider bridge 80-82-84. The result of this comparison (output of the operational amplifier 88) is sent to the comparator 58 via the analog "OR" gate 59. The comparator 58 compares the output of the operational amplifier 88 with the voltage produced by the sawtooth generator 57: the result is a conduction period of the transistor 42.

The part P2 is a charging with constant current as long as Verr is lower than a voltage of the order of 1.3 volts.

The part P3 follows a linear part and corresponds to a charging current that linearly decreases with the voltage Verr.

The change from part P2 to part P3 also takes place because an analog voltage threshold is exceeded.

The increase of the voltage "Verr" that enables to exceed this threshold, is caused by the comparator 32 the moment it establishes that the voltage of the battery reaches its set value (for example 4.1 volts). From this moment on, according as the battery LiIon continues to be charged, it needs ever less current and the comparator 32 thus continues to make "Verr" increase little by little inside part P3, which makes the charging current diminish progressively while the voltage of the battery is kept constant (for example, 4.1 volts).

A circuit is thus dedicated to realizing the linear function IL inversely proportional to Verr, for Verr lying between 1.2 V and 2 V.

In the diagram of FIG. 3 (other embodiments are also possible) the threshold of 1.2 V is obtained by means of silicon diodes 98 and 99 and with a resistor 105 whose value R is: R=0•. The value of this threshold may be reduced by making the value R different from zero, or increased by adding a third diode in series with the diodes 98 and 99.

If the tolerance obtained for the value of this threshold is considered insufficient, the diodes 98 and 99 may be replaced by a precise voltage reference of the type TL431 (in this case the value of the reference voltage being 2.5 V, the threshold may be brought back to the desired value of 1.2 or 1.4 V by increasing the value of the resistor 105).

In the diagram of FIG. 3 (other embodiments are possible), the gain of about −1 A/V (which permits of the change from 0.8 A to 0 A for Verr changing from 1.2 V to 2 V) is obtained (if R=0) by means of the divider bridge formed by the resistors 90 and 92. If the value R is different from zero, the gain depends on the resistors 90 and 92, but also on the resistors 105 and 62.

Simplified version

It is to be noted that in the diagram of FIG. 3, the circuit including the transistors 72 and 66, as well as the operational amplifier 60, and their accompanying resistors has for its object in the end to create the pre-charging area P1.

A version that is simplified, but in conformity with the invention, would not comprise the components defined above and Verr would directly drive the "OR" gate with diodes 59 (only with possibly the addition of a divider bridge to match the gain, or a diode to create a threshold).

Main version

The controllable power supply diagram of FIG. 3 is only an example; also other diagrams may be considered. For changing notably to a main version, in addition to the isolation to be introduced in the power channel by means of a transformer, a photocoupler may be introduced between the "OR" gate with diodes 59 and the comparator 58.

The part P4 corresponds to a stop of the charging current the moment Verr approaches 2 volts, which corresponds to that which has just been observed for the nominal voltage of the battery 25.

The circuit shown in FIG. 3 comprises the means for adhering to this pattern. An operational amplifier 60 has a (−) input and a (+) input. The (+) input receives the voltage Verr transmitted by the line 19 and the (−) input a threshold voltage, via a resistor 62 from a potentiometer divider 64 which is supplied with power by the reference voltage source 56. A threshold voltage of 0.3 volt is obtained by means of this potentiometer divider 64. Thus, as long as the voltage Verr is lower than this value, the output voltage of the amplifier 60 is zero thus turning off a transistor 66 whose base is supplied with power by the output of this amplifier 60 via a resistor 68. The base of this transistor 66 is connected, via a resistor 69, to a line 70 which is the charge return line of the battery 25. As the transistor 66 is turned off, a transistor 72 is rendered conductive. Its base then receives a voltage established at the central point of a series combination of two resistors 74 and 76 which is connected between an end of the reference voltage source 56 and the line 70. The transistor 72, rendered conductive, connects to line 70 one end of a resistor 78. The other end of this resistor 78 is connected to the node of the ends of the two resistors 80 and 82. The other end of the resistor 80 is connected to the reference voltage source 56 and the other end of the resistor 82 to the end of a resistor 84. The other end of this resistor 84 is connected to the negative pole of the motor car battery 22. When the resistor 78 is connected to the line 70 (by the transistor 72), a low-value voltage is applied to the (+) input of an operational amplifier 88. The (−) input of this amplifier 88 is connected to the node of the two resistors 90 and 92 connected in series with a threshold device formed by the diodes 98, 99, 100 and 101 connected to the output of the amplifier 60.

These diodes become conductive only when the voltage on the output of the amplifier 60 exceeds this threshold. By varying the value of a resistor 105, connected between the (−) input and the node between the diodes 100 and 99, the threshold device becomes conductive for a voltage Verr≈1.2 volts. The voltage on the input of the amplifier 88 is given by the sum of the voltage at the ends of the resistor 90 which reflects the voltage Verr and by the voltage at the ends of the resistor 94 which reflects the charging current of the battery 25. The Table below summarizes the functioning:

| Part of the pattern | Transistor 72 | Resistor 94 | 98, 99, 100, 101 | Output (88) |
|---|---|---|---|---|
| P1 | Conductive | Without effect | Turned off | Variable |
| P2 | Turned-off | Produces ≈0.3 volt | Turned off | Variable |
| P3 | Turned-off | Produces ≈R × IL | Conductive | 0 |
| P4 | Turned-off | Produces ≈0 V | Conductive | 0 |

Although an embodiment has been described utilizing a motor car battery, other energy sources (power grid, for example) are also within the spirit and scope of the invention.

What is claimed:

1. A charging system comprising:
   a circuit to be charged, situated at a first location,
   an energy source, situated at a second location, having a high impedance control input for controlling a voltage of the energy source,
   a link for connecting the first and second locations and for transmitting energy,
   a measuring circuit situated at the first location for supplying an error signal to said control input while evaluating an electrical magnitude relating to said circuit to be charged.

2. A charging system as claimed in claim 1, wherein said link is provided for transmitting said error signal.

3. A charging system as claimed in claim 1, wherein the energy source is a battery.

4. A charging system as claimed in claim 3, further comprising a circuit for ensuring a charging of the battery according to a certain characteristic giving the energy as a function of the error signal.

5. A charging system as claimed in claim 4, wherein the characteristic has various parts delimited by thresholds of the error signal and the circuit comprises devices for implementing the thresholds.

6. An energy transfer system comprising:
   a device comprising
     a first energy source to be charged, and
     a measuring circuit, coupled to the first energy source, for providing an error signal derived from an electrical quantity of the first energy source;
   a second energy source, remotely located from the device, for charging the first energy source, the second energy source comprising
     a power supply, and
     a regulating circuit, coupled to the power supply, for regulating a voltage of the power supply in response to the error signal received at a high impedance control input.

7. A system of claim 6, wherein the first circuit comprises a battery arrangement.

8. A system of claim 6, wherein the power supply comprises a battery arrangement.

9. A system of claim 6, wherein the first circuit is charged according to a charging characteristic giving the energy as a function of the error signal.

10. A device comprising:
    a first energy source to be charged from a second energy source at a remote location, the energy source comprising a power supply and a regulating circuit for regulating a voltage of the power supply and the regulating circuit having a high impedance control input, and
    a measuring circuit, coupled with the first energy source, for providing an error signal obtained from an electrical quantity of the first energy source, to the control input.

* * * * *